(12) United States Patent
Medapalli

(10) Patent No.: US 12,701,435 B2
(45) Date of Patent: Aug. 4, 2026

(54) SYSTEMS, METHODS, AND DEVICES FOR ENHANCED INTEGRATION OF WIRELESS ENVIRONMENTS

(71) Applicant: Cypress Semiconductor Corporation, San Jose, CA (US)

(72) Inventor: Kameswara Medapalli, Saratoga, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 458 days.

(21) Appl. No.: 18/352,892

(22) Filed: Jul. 14, 2023

(65) Prior Publication Data

US 2024/0031833 A1     Jan. 25, 2024

Related U.S. Application Data

(60) Provisional application No. 63/390,568, filed on Jul. 19, 2022.

(51) Int. Cl.
*H04W 4/00* (2018.01)
*H04W 24/02* (2009.01)

(52) U.S. Cl.
CPC ................................... *H04W 24/02* (2013.01)

(58) Field of Classification Search
CPC . H04W 28/0268; H04W 48/18; H04W 72/12; H04W 24/08; H04W 76/15; H04W 4/40; H04W 76/28; H04W 8/22; H04W 92/18; H04W 28/0831; H04W 28/18; H04W 48/16; H04W 60/00; H04W 60/04; H04W 64/00; H04W 72/30; H04W 88/18; H04W 12/06; H04W 12/069; H04W 24/10;

H04W 28/0221; H04W 28/24; H04W 48/10; H04W 52/02; H04W 52/0216; H04W 52/325; H04W 72/02; H04W 72/21; H04W 72/542; H04W 76/27; H04W 24/02; H04W 28/02; H04W 28/0231;

(Continued)

(56) References Cited

U.S. PATENT DOCUMENTS

2004/0163073 A1    8/2004    Krzyzanowski et al.
2005/0289264 A1    12/2005    Illowsky et al.

(Continued)

OTHER PUBLICATIONS

International Search and Written Opinion Application PCT/US2023/27982 dated Oct. 18, 2023; 11 pages.

*Primary Examiner* — Quan M Hua

(57) ABSTRACT

Systems, methods, and devices enhance integration of components of a wireless environment. Methods include determining, using a processing device, a plurality of contextual parameters identifying a plurality of settings associated with an application executed on a central wireless device and a plurality of wireless devices included in an operational environment of the central wireless device. Methods also include determining, using the processing device, a plurality of wireless device parameters and wireless connection parameters for the plurality of wireless devices based on the contextual parameters. Methods further include generating, using the processing device, instructions for each of the plurality of wireless devices based, at least in part, on the plurality of contextual parameters and a native format and wireless protocol of each of the plurality of wireless devices.

20 Claims, 6 Drawing Sheets

(58) Field of Classification Search
CPC . H04W 28/0278; H04W 28/04; H04W 36/00;
H04W 36/0011; H04W 36/0055; H04W
4/021
See application file for complete search history.

(56) References Cited

U.S. PATENT DOCUMENTS

| | | | |
|---|---|---|---|
| 2012/0302286 A1 | 11/2012 | Beninghaus et al. | |
| 2014/0244710 A1* | 8/2014 | Sharma | H04L 67/63 |
| | | | 709/201 |
| 2016/0364114 A1 | 12/2016 | Von et al. | |
| 2019/0028338 A1* | 1/2019 | Kozura | H04W 12/069 |
| 2020/0205062 A1* | 6/2020 | Azizi | H04W 4/08 |
| 2020/0351341 A1 | 11/2020 | Illowsky et al. | |
| 2022/0039082 A1* | 2/2022 | Belleschi | H04W 4/40 |
| 2022/0182428 A1* | 6/2022 | Roedel | G06Q 10/063114 |

* cited by examiner

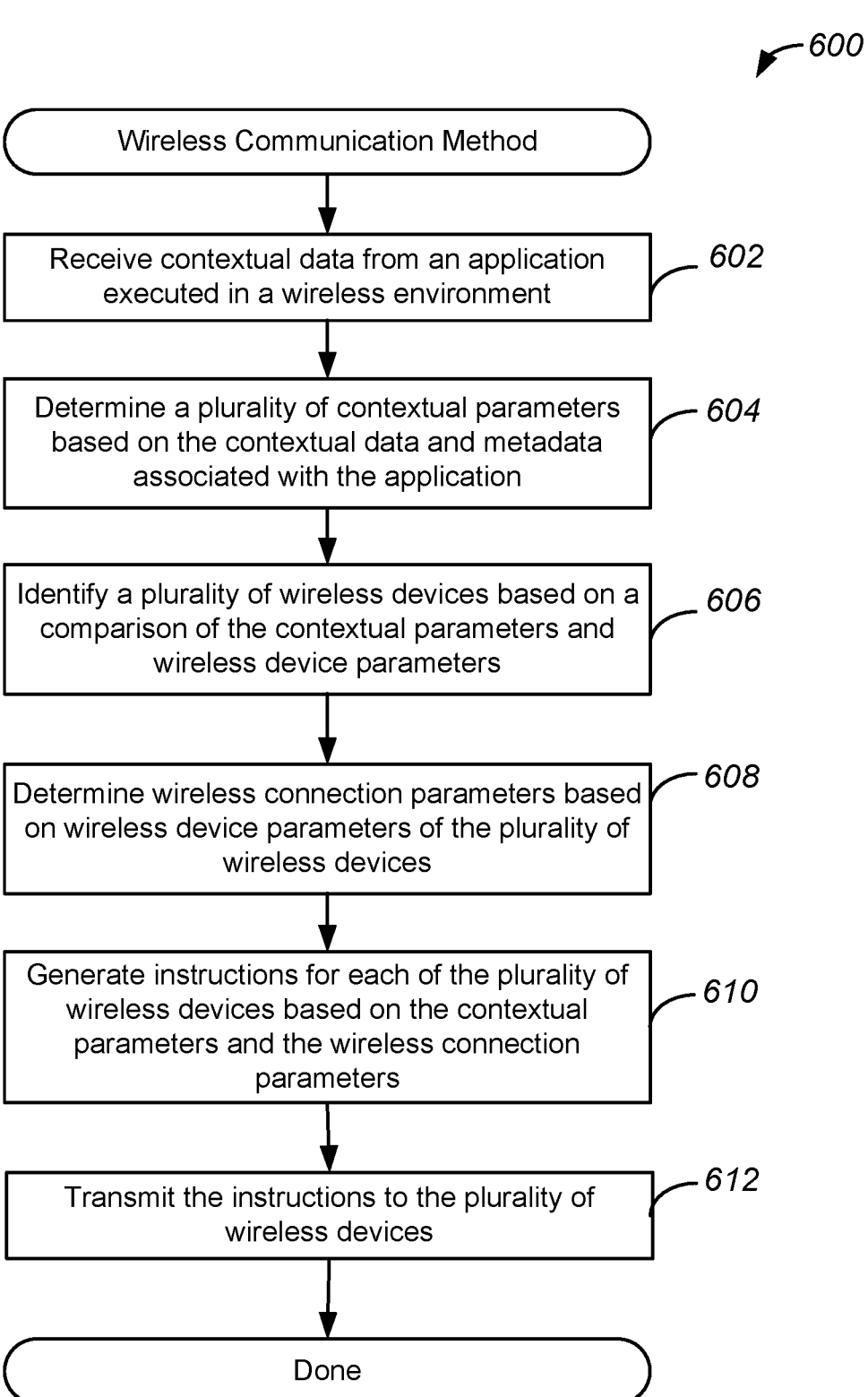

*600*

Wireless Communication Method

Receive contextual data from an application executed in a wireless environment — *602*

Determine a plurality of contextual parameters based on the contextual data and metadata associated with the application — *604*

Identify a plurality of wireless devices based on a comparison of the contextual parameters and wireless device parameters — *606*

Determine wireless connection parameters based on wireless device parameters of the plurality of wireless devices — *608*

Generate instructions for each of the plurality of wireless devices based on the contextual parameters and the wireless connection parameters — *610*

Transmit the instructions to the plurality of wireless devices — *612*

Done

*FIG. 6*

SYSTEMS, METHODS, AND DEVICES FOR ENHANCED INTEGRATION OF WIRELESS ENVIRONMENTS

CROSS-REFERENCE TO RELATED APPLICATIONS

This application claims the benefit under 35 U.S.C. § 119(e) of U.S. Provisional Patent Application No. 63/390, 568, filed on Jul. 19, 2022, which is incorporated herein by reference in its entirety for all purposes.

TECHNICAL FIELD

This disclosure generally relates to wireless devices, and more specifically, to enhancement of integration of such wireless devices in wireless environments.

BACKGROUND

Wireless devices may communicate with each other via one or more wireless modalities, such as a Wi-Fi connection or a Bluetooth connection. Accordingly, such wireless communication may be implemented in a manner compliant with a wireless protocol. Moreover, such wireless devices may include various hardware components to facilitate such communication. For example, wireless devices may include transmission media that may include one or more antennas. When implemented in a wireless environment, such as a smart home environment, different wireless devices may use different wireless protocols. Conventional techniques for providing connectivity between such devices remain limited because they are not able to efficiently provide connectivity between different devices using different wireless protocols in a manner that provides an integrated experience for a user.

BRIEF DESCRIPTION OF THE DRAWINGS

FIG. 6 illustrates an example of an additional method for wireless communication, performed in accordance with some embodiments.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless devices may be implemented in a wireless environment to support a variety of functionalities. For example, wireless devices may be configured to support smart home capabilities for various appliances and devices such as light bulbs, thermostats, security systems, and various Internet of Things (IoT) devices. Moreover, various other devices and systems, such as entertainment systems, gaming consoles, and gaming controllers. In such a wireless environment, different wireless devices may use different wireless protocols, and share access to different wireless networks. In one example, a gaming console and gaming controllers may communicate using Bluetooth connections, smart devices may communicate using Wi-Fi connections, and other smart devices may communicate using 802.15.4 connections. Accordingly, conventional techniques for wireless communication remain limited because different wireless devices in the same wireless environment may use different types of connections, and consequently they are not able to provide a unified experience for a user of the wireless environment.

Embodiments disclosed herein provide the ability to manage wireless communications between different wireless devices having different types of wireless connections. Moreover, instructions may be generated for such wireless devices to provide a coordinated and integrated experience for a user. As will be discussed in greater detail below, one or more environmental conditions which may be user-driven, such as a user accessing or executing a software application, may cause the identification of different wireless devices and the generation of instructions for such wireless devices based on the environmental conditions. In various embodiments, the instructions may be translated to the native format of each of the wireless devices and transmitted to them for execution thus enabling coordination of such instructions across different wireless devices using different wireless connections. In one example, smart devices and other wireless devices implemented in an ambient environment of the user may be provided with instructions such that they dynamically respond to actions of the user and content that the user may be interacting with in an entertainment system or a gaming console.

Figure 1:
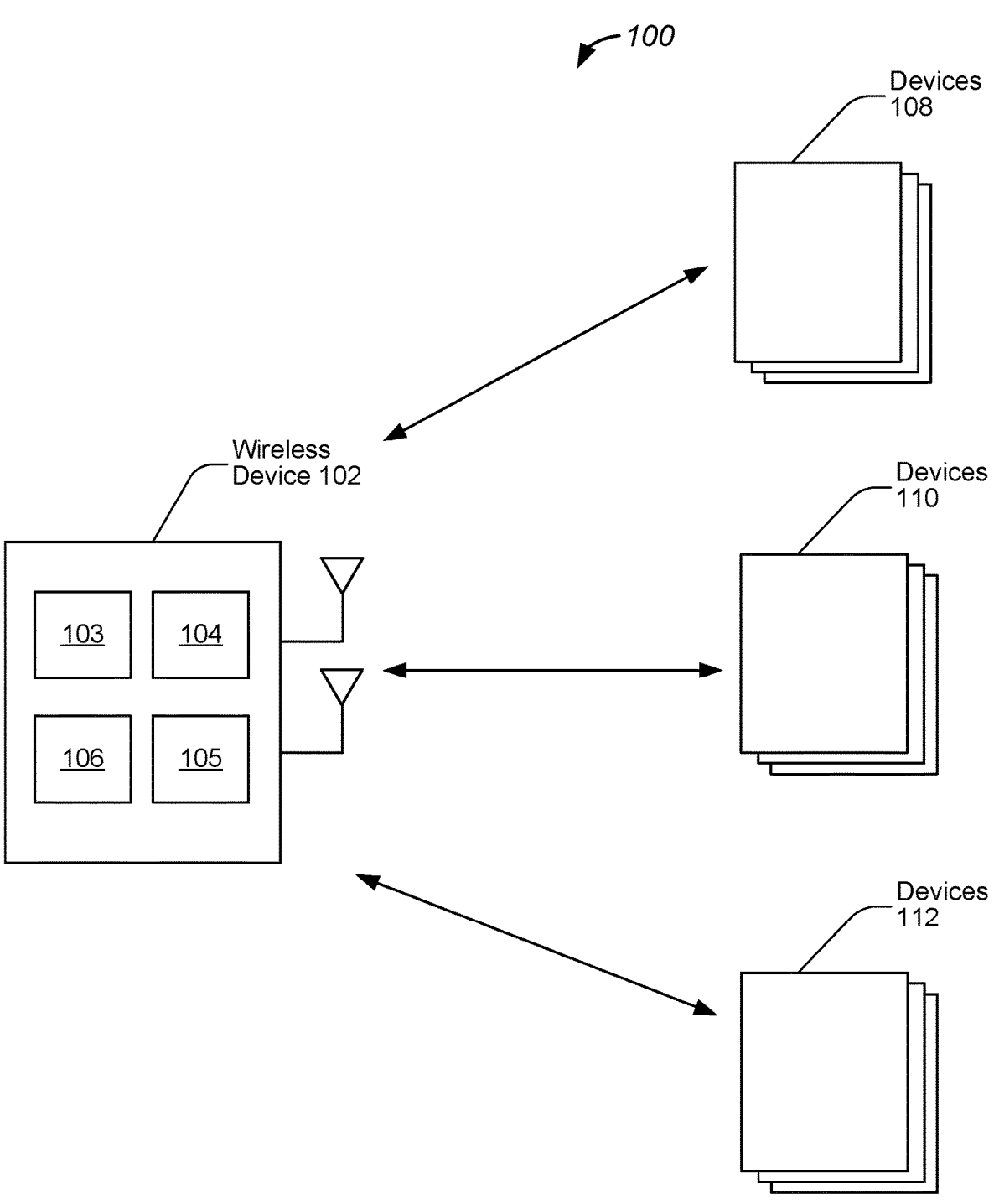
FIG. 1 illustrates an example of a system for wireless communication, configured in accordance with some embodiments.

FIG. 1 illustrates an example of a system for wireless communication, configured in accordance with some embodiments. Accordingly, a system, such as system 100, may include wireless devices using different wireless protocols, but are also configured to be provide an integrated wireless environment for a user. As will be discussed in greater detail below, wireless devices included in system 100 may be configured to provide communication and coordination between wireless devices having different computational capabilities and communications modalities.

In various embodiments, system 100 may include wireless device 102 which may be compatible with one or more wireless transmission protocols, such as a Wi-Fi protocol, a Bluetooth protocol, as well as one or more other protocols, such as an 802.15.4 protocol. In some embodiments, wireless device 102 includes collocated transceivers. For example, wireless device 102 may include a Wi-Fi transceiver, a Bluetooth transceiver, and an 802.15.4 transceiver that may share access to a communications medium. For example, wireless device 102 may include a first transceiver, such as transceiver 103, a second transceiver, such as transceiver 104, and a third transceiver, such as transceiver 105. In this example, transceiver 103 may be compatible with an 802.15.4 specification and protocol, transceiver 104 may be compatible with a Wi-Fi specification and protocol, transceiver 105 may be compatible with a Bluetooth specification and protocol. For example, the Bluetooth protocol may be a Bluetooth Low Energy (BLE) protocol, also referred to as Bluetooth Smart. Moreover, the 802.15.4 protocol may be compatible with a Matter standard. It will be appreciated that while an 802.15.4 standard is described, a variety of other standards configured to low-rate wireless connections are contemplated and disclosed herein. In some embodiments, wireless device 102 may be a component of a smart home environment, such as a component of an entertainment system. For example, wireless device 102 may be a gaming console, a smart television, or a personal computer. It will be appreciated that wireless device 102 may be any suitable device.

As shown in FIG. 1, various wireless communications devices may be in communication with each other via one or more wireless communications mediums. Accordingly, wireless device 102 may include one or more antennas, and may also include processing device 106 and, as discussed above, may also include collocated transceivers, such as transceiver 103, transceiver 104, and transceiver 105. As disclosed herein each transceiver may also have an associated transmit and receive chain. In various embodiments, processing devices and transceivers are configured to establish communications connections with other devices, and transmit data in the form of data packets via such communications connections. Moreover, as will be discussed in greater detail below, a central device, such as wireless device 102, may be configured to determine contextual parameters and coordinate operations of other wireless devices in a heterogenous smart home environment.

In some embodiments, system 100 may further include devices 108 which may be wireless devices communicatively coupled with wireless device 102. As similarly discussed above, devices 108 may be compatible with one or more wireless transmission protocols, such as an 802.15.4 protocol, a Wi-Fi protocol, or a Bluetooth protocol. In some embodiments, devices 108 may be configured as stations in communication with wireless device 102. For example, devices 108 may be smart devices or other devices, such as those found in gaming systems, smart home devices, and medical implants. In various embodiments, devices 108 may be different types of devices than wireless device 102. As discussed above, each of devices 108 may include one or more antennas, as well as processing devices and transceivers, which may also be configured to establish communications connections with other devices, and transmit data in the form of data packets via such communications connections. As will be discussed in greater detail below, devices 108 may also be configured to receive instructions from wireless device 102 and configured to execute the instructions to provide an integrated experience for a user of wireless device 102.

System 100 may also include devices 110 and devices 112 which may also be compatible with one or more wireless transmission protocols, such as an 802.15.4 protocol, a Wi-Fi protocol, or a Bluetooth protocol. In various embodiments, devices 110 and devices 112 may be different devices than devices 108, and may be implemented in a different environmental context than devices 108. For example, devices 110 may be IoT devices that are included in a home security system and devices 112 may be IoT devices included in a climate control system, such as one or more components of a thermostat. Accordingly, as will be discussed in greater detail below with reference to FIG. 3, devices 108, devices 110, and devices 112 may each be different types of devices included in an operational environment of wireless device 102 and one or more users of wireless device 102.

Figure 2:
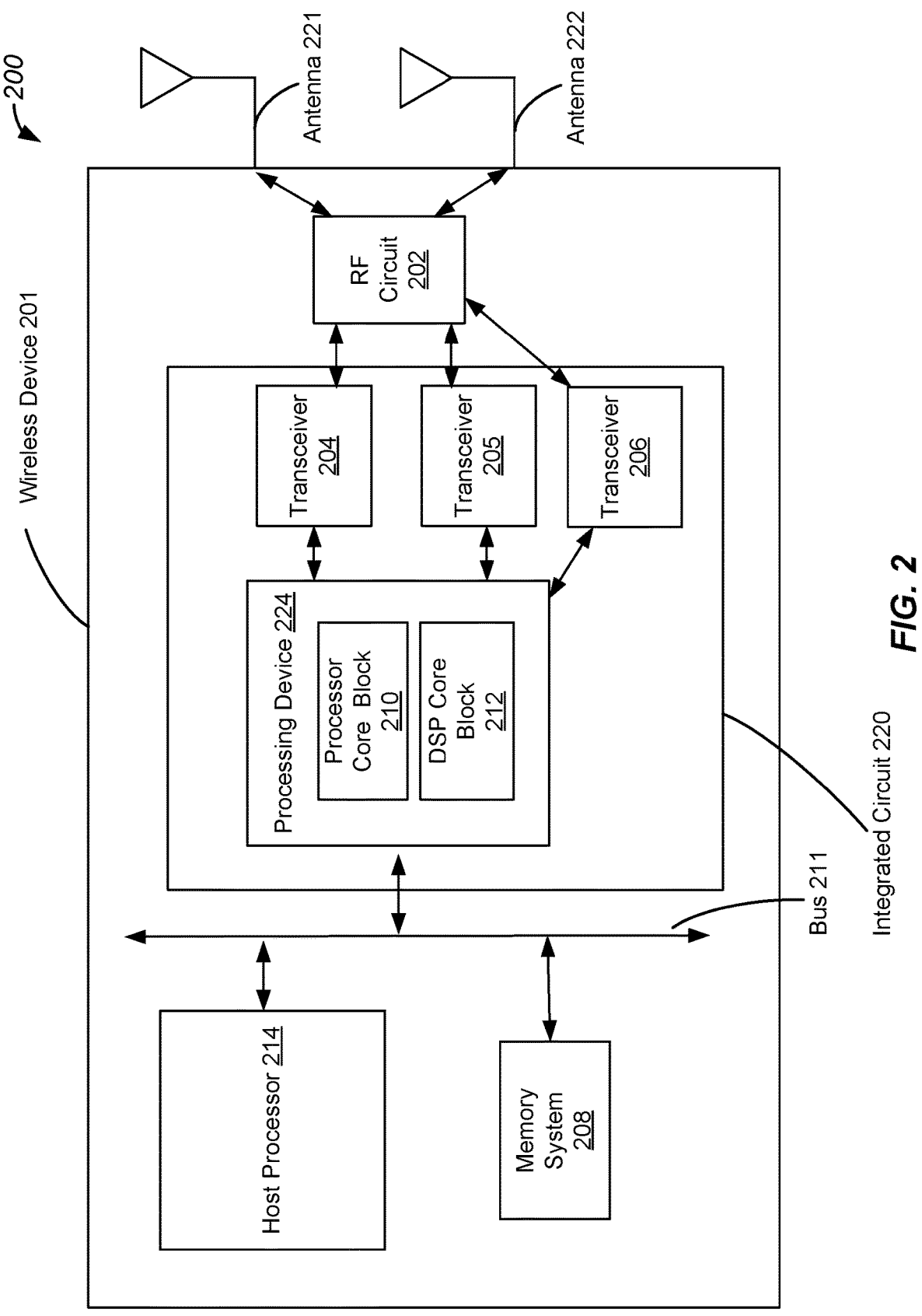
FIG. 2 illustrates an example of another system for wireless communication, configured in accordance with some embodiments.

FIG. 2 illustrates an example of a system for wireless communication, configured in accordance with some embodiments. More specifically, FIG. 2 illustrates an example of a system, such as system 200, that includes wireless device 201. It will be appreciated that wireless device 201 may be one of any of the wireless devices discussed above with reference to FIG. 1, such as wireless device 102, devices 108, devices 110, and devices 112. In one example, wireless device 102 included in or is configured as a computing system, such as a gaming console. Accordingly, as will be discussed in greater detail below, wireless device 102 may be configured as a gaming console configured to execute a gaming application, and further configured to communicate with other devices, including gaming devices such as game controllers, wirelessly.

In various embodiments, wireless device 201 includes one or more transceivers, such as transceiver 204, transceiver 205, and transceiver 206. In one example, system 200 includes transceiver 204 which is configured to transmit and receive signals using a communications medium that may include antenna 221 or antenna 222. As noted above, transceiver 204 may be a Wi-Fi transceiver. Accordingly, transceiver 204 may be compatible with a Wi-Fi communications protocol, such as an 802.11ax protocol. In various embodiments, transceiver 204 includes a modulator and demodulator as well as one or more buffers and filters, that are configured to generate and receive signals via antenna 221 and/or antenna 222.

System 200 additionally includes transceiver 205 which may be collocated with transceiver 204 in wireless device 201. In various embodiments, transceiver 205 is also configured to transmit and receive signals using a communications medium that may include antenna 221 or antenna 222. Accordingly, transceiver 205 may be a Bluetooth transceiver compatible with a Bluetooth communications protocol. In one example, the Bluetooth protocol may be a Bluetooth Low Energy (BLE) protocol. Moreover, transceiver 205 includes a modulator and demodulator as well as one or more buffers and filters, that are configured to generate and receive signals via antenna 221 and/or antenna 222.

System 200 further includes transceiver 206 which may be collocated with transceiver 204 and transceiver 205 in wireless device 201. In various embodiments, transceiver 206 is also configured to transmit and receive signals using a communications medium that may include antenna 221 or antenna 222. Moreover, transceiver 206 may be configured to be compatible with an 802.15.4 protocol. In various embodiments, transceiver 206 includes a modulator and demodulator as well as one or more buffers and filters, that are configured to generate and receive signals via antenna 221 and/or antenna 222. While various embodiments are described with reference to Bluetooth, Wi-Fi, and 802.15.4 communications protocols, it will be appreciated that any suitable protocol may be used.

System 200 further includes processing device 224 which may include logic implemented using processing elements and/or one or more processor cores. In some embodiments, processing device 224 is configured to determine contextual parameters and generate instructions for wireless devices, as will be discussed in greater detail below. More specifically, processing device 224 includes one or more processing devices comprising processing elements that are configured to implement such contextual parameter determination and instruction generation. Moreover, processing device 224 includes one or more components configured to implement a medium access control (MAC) layer that is configured to control hardware associated with a wireless transmission medium, such as that associated with a Wi-Fi transmission medium and/or an 802.15.4 transmission medium. In one example, processing device 224 may include processor core block 210 that may be configured to implement a driver, such as a Bluetooth driver, Wi-Fi driver, and/or an 802.15.4 driver. Processing device 224 may further include digital signal processor (DSP) core block 212 which may be configured to include microcode.

In various embodiments, processor core block 210 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack includes layers for a Bluetooth network encapsulation protocol, radio frequency communication, service discovery protocol, as well as various other high level data layers. Moreover, a controller stack includes a link management protocol, a host controller interface, a link layer which may be a low energy link layer, as well as various other timing critical layers.

System 200 further includes radio frequency (RF) circuit 202 which is coupled to antenna 221 and antenna 222. In various embodiments, RF circuit 202 may include various components such as an RF switch, a diplexer, and a filter. While FIG. 2 illustrates system 200 as having two antennas, it will be appreciated that system 200 may have a single antenna, or any suitable number of antennas. Accordingly, RF circuit 202 may be configured to select an antenna for transmission/reception, and may be configured to provide coupling between the selected antenna, such as antenna 221, and other components of system 200 via a bus, such as bus 211. While one RF circuit is shown, it will be appreciated that wireless communications device 201 may include multiple RF circuits. Accordingly, each of multiple antennas may have its own RF circuit. Moreover, each one may be associated with a particular wireless communications protocol, such as a first antenna and RF circuit for Wi-Fi, a second antenna and RF circuit for Bluetooth, and a third antenna and RF circuit for 802.15.4.

System 200 includes memory system 208 which is configured to store one or more data values associated with wireless communication operations discussed above and in greater detail below. Accordingly, memory system 208 includes storage device, which may be a non-volatile random access memory (NVRAM) configured to store such data values, and may also include a cache that is configured to provide a local cache. In various embodiments, system 200 further includes host processor 214 which is configured to implement processing operations implemented by system 200. In various embodiments, host processor 214 and memory system 208 are additionally configured to execute a software application, such as a gaming application. Accordingly, host processor 214 and memory system 208 may be configured to execute such a gaming application and generate an output provide to, for example, a display device and an audio device, such as a speaker.

It will be appreciated that one or more of the above-described components may be implemented on a single chip, or on different chips. For example, transceiver 204, transceiver 205, transceiver 206, and processing device 224 may be implemented on the same integrated circuit chip, such as integrated circuit chip 220. In another example, transceiver 204, transceiver 205, transceiver 206, and processing device 224 may each be implemented on their own chip, and thus may be disposed separately as a multi-chip module or on a common substrate such as a printed circuit board (PCB). It will also be appreciated that components of system 200 may be implemented in the context of a home entertainment system having multiple components. Accordingly, some components, such as integrated chip 220, may be implemented in a first location, while other components, such as antenna 221, may be implemented in second location, and coupling between the two may be implemented via a coupler such as RF circuit 202.

Figure 3:
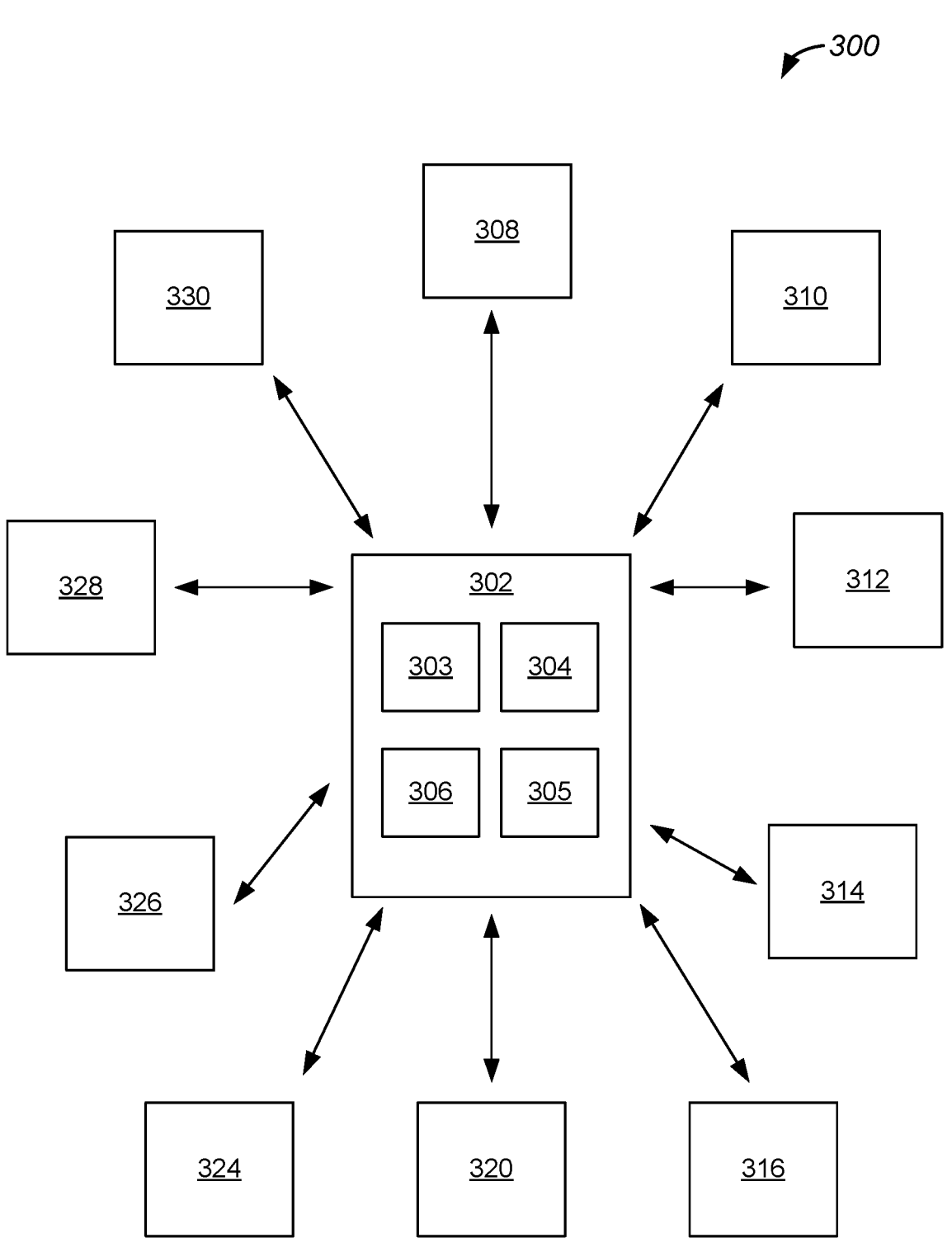
FIG. 3 illustrates an example of another system for wireless communication, configured in accordance with some embodiments.

FIG. 3 illustrates an example of an additional system for wireless communication, configured in accordance with some embodiments. As will be discussed in greater detail below, system 300 may be implemented in the context of a smart home environment which may include various different types of wireless devices having different wireless capabilities. Because the wireless devices operate using different wireless protocols, some of them may be unable to communicate with each other. However, as will be discussed in greater detail below, a central device may be configured to support multiple different communications protocols, and thus may be able to communicate with all of them. Moreover, the central device may be configured to generate instructions for such devices based on an input to coordinate their operation and extend the experience of a user of the central device to additional wireless devices included in the ambient environment of the user.

As similarly discussed above, a central device, such as wireless device 302, may include processing device 303 as well as various transceivers, such as transceiver 304, transceiver 305, and transceiver 306. As will be discussed in greater detail below, wireless device 302 may be a computing device, such as a gaming console, configured to execute an application, such as a gaming application. Moreover, as will also be discussed in greater detail below, wireless device 302 is configured to control the operation of additional wireless devices based on features of a user as well as dynamic content of the gaming application. In one example, transceiver 304 is configured to be compatible with a Wi-Fi protocol, transceiver 305 is configured to be compatible with a Bluetooth protocol, and transceiver 306 is configured to be compatible with an 802.15.4 protocol. Accordingly, wireless device 302 may be a tri-mode device capable of communication via all three protocols.

As additionally shown in system 300, wireless device 302 is configured to central coordinate operation of a variety of different devices in a heterogenous wireless environment that may surround a user of wireless device 302. For example, device 324, device 320, and device 316, may be gaming devices such as controllers and a headset that are configured to communicate with wireless device 102 via a Bluetooth connection. Accordingly, device 324, device 320, and device 316 may be compatible with one or more of Bluetooth and BLE, and may use such connections to transmit and receive gaming data from wireless device 102.

System 300 may also include device 326, device 314, device 330, and device 310 which may be smart home devices. For example, device 326, device 314, device 330, and device 310 may be light bulbs each enabled with luminance and color settings that may be controlled by inputs received via an 802.15.4 wireless connection. It will be appreciated that device 326, device 314, device 330, and device 310 may be any suitable type of smart home device, and each may be individually controlled.

System 300 may also include device 328 which may be a home entertainment device. For example, device 328 may be a wirelessly controlled speaker that is communicatively coupled to wireless device 302 via a Wi-Fi connection. Accordingly, wireless device 302 may be configured to control operation of device 328, and to send audio data to device 328. It will be appreciated that device 328 may include multiple audio devices, and may thus be part of an audio system.

System 300 may also include device 312 which may be a climate control device. For example, device 312 may be a smart home thermostat capable of being wirelessly controlled via a Wi-Fi connection and/or a Bluetooth connection. Accordingly, device 312 may be coupled to various other climate control devices in the smart home environment, such as a heater and/or an air conditioning unit. Moreover, device 312 may also be coupled to wireless device 302 and may be configured to receive instructions from wireless device 302. In this way, wireless device 302 may also control the operation of one or more components of a climate control system associated with a user.

System 300 may also include device 308 which may be a security device. Accordingly, device 308 may be a security console for a home security system. In one example, device 308 may be a specific component of a security system, such as a smart lock on a door. In various embodiments, device 308 may be communicatively coupled to wireless device 302 via a Wi-Fi connection and/or a Bluetooth connection, and may be configured to receive one or more inputs from wireless device 302. In this way, wireless device 302 may also interface with various components of a security system associated with a user.

Figure 4:
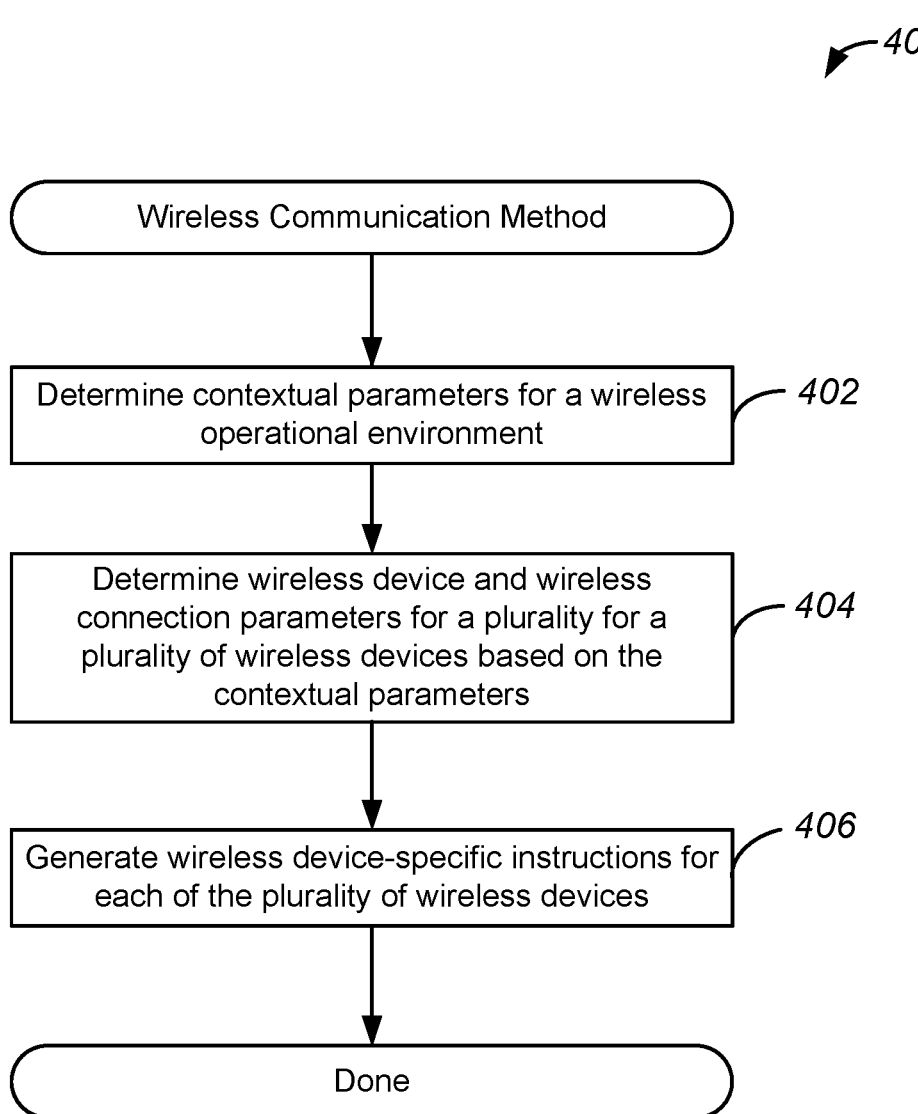
FIG. 4 illustrates an example of a method for wireless communication, performed in accordance with some embodiments.

FIG. 4 illustrates an example of a method for wireless communication, performed in accordance with some embodiments. Accordingly, a method, such as method 400, may be performed to coordinate operations performed by various devices in an ambient environment of a user to further extend the experience of the user into that ambient environment. More specifically, a central device may identify one or more contextual parameters based on one or more actions taken by a user as well as an application executed by the user, and may generate coordinated sets of instructions for the various devices based, at least in part, on the contextual parameters.

Method 400 may perform operation 402 during which contextual parameters may be determined for a wireless operational environment. In various embodiments, the contextual parameters may be determined based on one or more features of an application executed by a user on a wireless device. For example, a wireless device operating as a central device may be a gaming console. Accordingly, a user may load an application, such as a game, and may execute the gaming application. As will be discussed in greater detail below, the gaming application may include various information such as user profile data, audio data, and graphics data. Accordingly, the gaming data as well as associated data, such as metadata and metadata tags, may be retrieved by the gaming console, and may be used to determine contextual parameters.

As will be discussed in greater detail below, the contextual parameters may define one or more conditions to be implemented in the ambient environment. Such contextual parameters may be defined by an entity, such as an application programmer, or may be dynamically determined by the wireless device itself. In one example, the contextual parameters may be included in metadata of the gaming application.

Method 400 may perform operation 404 during which wireless device and wireless connection parameters may be determined for a plurality for a plurality of wireless devices based on the contextual parameters. Accordingly, the contextual parameters determined during operation 402 may be mapped to wireless devices based on a designated mapping. Moreover, the identified devices may have associated wireless connection data that may also be retrieved. Accordingly, during operation 404, parameters identifying particular wireless devices as well as wireless connection requirements may be determined.

Method 400 may perform operation 406 during which wireless device-specific instructions may be generated for each of the plurality of wireless devices. Accordingly, as will be discussed in greater detail below, a wireless device configured as a central device may generate a set of instructions for each of the identified wireless devices in accordance with their respective wireless connection parameters. Accordingly, instructions may be generated and sent in accordance with a Wi-Fi protocol, a Bluetooth protocol, and an 802.15.4 protocol to implement the conditions defined by the contextual parameters in the ambient environment of the user.

Figure 5:
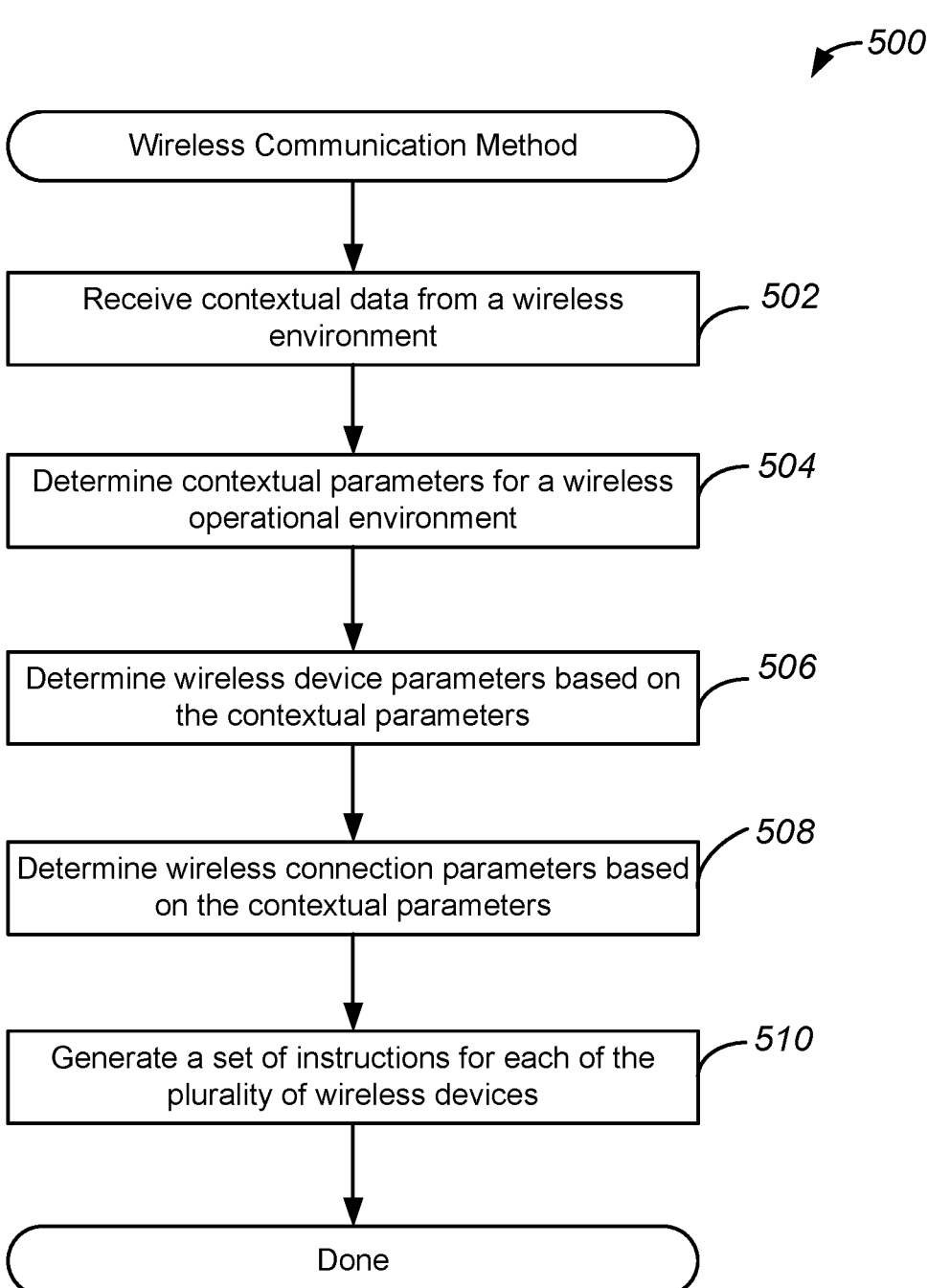
FIG. 5 illustrates an example of another method for wireless communication, performed in accordance with some embodiments.

FIG. 5 illustrates an example of another method for wireless communication, performed in accordance with some embodiments. Accordingly, a method, such as method 500, may be performed to coordinate operations performed by various devices in an ambient environment of a user to further extend the experience of the user and integrate the operation of such wireless devices in that experience. More specifically, a central device may identify one or more contextual parameters based on features associated with a user as well as devices and equipment used by the user. Coordinated sets of instructions may be generated for the various devices based, at least in part, on the contextual parameters.

Method 500 may perform operation 502 during which contextual data may be received from a wireless environment. As similarly discussed above, the contextual parameters may be determined based on features of an application executed by a user on a wireless device as well as configuration parameters of a user profile associated with that user. For example, such contextual parameters may be ambient lighting settings and temperature settings for smart devices included in the ambient environment and communicatively coupled with the central wireless device. The contextual parameters may also include settings for the user stored in a user profile. In the example where the central wireless device is a gaming console, additional settings may be stored in a user profile, and such settings may identify parameters such as gaming controller settings, haptic feedback and vibration settings, as well as other gameplay settings.

In some embodiments, the contextual data may be inferred by the central wireless device. For example, the central wireless device may record such data based on previous gaming sessions. Accordingly, the central wireless device may have previously performed a learning phase where known wireless devices in the ambient environment are polled, and information identifying their current settings while a user is playing may be stored and aggregated to determine contextual data for that user. In various embodiments, the contextual data may be stored in multiple different storage locations, and during operation 502, the contextual data may be retrieved by the central wireless device.

In various embodiments, the receiving of contextual data is included in or responsive to a system or user event. For example, if a user logs off of a game, and a user ID switches to another user, method 500 may be triggered and new contextual data may be retrieved. In another example, a change of input device or a type of input device may trigger method 500. For example, if a user begins using a VR headset, the device may have new ambient settings associated with it, as may have been previously been stored in a device profile that may have been populated by an entity, such as a manufacturer or a user. Such new ambient settings included in contextual data retrieved upon detection of the VR headset may include settings such as activating a security system or locking a door to enhance security for the gaming environment.

Method 500 may perform operation 504 during which contextual parameters may be determined for the wireless environment. Accordingly, after the contextual data has been retrieved, it may be merged and a component, such as the central wireless device, may use the merged contextual data to generate a set of parameters used as contextual parameters. In one example, the contextual data may be parsed and filtered to identify contextual parameters that may be relevant for a operational environment, such as a current gaming session. More specifically, the retrieved data may be filtered to identify a plurality of settings associated with a list of known wireless devices. Such a list may be populated based on a previous registration process of those wireless devices with the central wireless device, as well as an indication, such as an acknowledgement message, that those devices are active and available. Accordingly, during operation 504, the contextual data may be translated to contextual parameters specific to a known set of wireless devices.

Method 500 may perform operation 506 during which wireless device parameters may be determined based on the contextual parameters. Accordingly, the wireless devices identified during operation 504 may be used to identify wireless device parameters associated with those wireless devices. More specifically, wireless device information such a device identifiers, status information, and device capabilities may be retrieved for each device associated with a contextual parameter determined during operation 504.

In one example, such devices may be identified based on a designated mapping generated during device registration. For example, a contextual parameter identifying a light or luminosity setting may be mapped to a set of wireless devices that are smart light bulbs, and such a mapping may have been previously determined when the smart light bulbs initiated communication with the central wireless device. Accordingly, a contextual parameter may have a category identifier which may be defined by an entity, such as an administrator, manufacturer, or the user, and appropriate wireless devices may be mapped to that category identifier during registration based on known product information about the device.

Method 500 may perform operation 508 during which wireless connection parameters may be determined based on the contextual parameters. In various embodiments, the identified wireless devices may have associated wireless connection data that may also be retrieved. Such connection data may identify a type of wireless protocol used by the device as well as any other suitable network settings associated with the identified wireless devices.

Method 500 may perform operation 510 during which a set of instructions may be generated for each of the plurality of wireless devices. Accordingly, as will be discussed in greater detail below, the central wireless device may generate a set of instructions for each of the identified wireless devices in accordance with their respective wireless connection parameters. More specifically, the central wireless device may generate a set of instructions based on the identified contextual parameters. For example, the instructions may be generated based on settings identified in the contextual parameters as well as a native programming format of each respective wireless device. In one example, where a contextual parameter identifies a luminosity setting, the central wireless device may generate an instruction that is a command for the target wireless device, as identified by the mapping discussed above, to set its luminosity to the identified luminosity setting. The instruction may also be compatible with and packetized in accordance with a wireless protocol of the target wireless device. This may be performed for each identified contextual parameter, and the instructions may subsequently be transmitted to the target wireless devices.

FIG. 6 illustrates an example of an additional method for wireless communication, performed in accordance with some embodiments. Accordingly, a method, such as method 600, may be performed to coordinate operations performed by various devices in an ambient environment of a user to further extend the experience of the user and integrate the operation of such wireless devices in that experience. More specifically, a central wireless device may identify one or more contextual parameters based on dynamic content of an application executed by the central wireless device. Coordinated sets of instructions may be generated for the various devices based, at least in part, on the contextual parameters.

Method 600 may perform operation 602 during which contextual data may be received from an application executed in a wireless environment. In various embodiments, the central wireless device may be a gaming console implemented in a smart home environment. As discussed above, the gaming console maybe specifically configured to communicate with various wireless devices included in the smart home environment. Such devices may be part of the gaming system, part of a broader entertainment system, or part of one or more other systems in the smart home environment such as a security system or climate control system.

During operation, an application, such as a gaming application, may be executed on the central wireless device. For example, a user may be playing a game on the central wireless device, and application data may be loaded and executed on the central wireless device. In various embodiments, contextual data may be retrieved from the application data of that is being executed. In this way, contextual parameters may be determined, modified, and updated dynamically based on what the game code that is currently being executed.

In one example, the contextual data may be included as metadata in the gaming application. Accordingly, an entity, such as a software developer, may include contextual data in metadata of the gaming application. Such contextual data may include a simplified version of one or more aspects of the gaming data itself. For example, metadata may be updated to include settings such as lower luminance settings and additional audio settings, such as activation of a speaker, for a particular location in the video game. Accordingly, data objects in the game logic may have metadata that is augmented to include contextual data defined by a game designer during a design process.

In various embodiments, a custom application program interface (API) may be provided to a software developer to include settings into the metadata that will be retrieved as contextual data. Accordingly, a custom software development tool may be used to perform the metadata augmentation, and the central wireless device may also have a corresponding API through which the settings are detected and retrieved from the metadata. In some embodiments, the custom API may be developed by an entity, such as a device manufacturer or a software developer, and/or may be incorporated in an on-demand computing platform thus being available as a component of an on-demand service or application used to manage wireless devices.

In another example, the contextual parameters may be determined by the central wireless device based on the execution of the application data. For example, where the central wireless device is a gaming console executing a game, the gaming console will have access to the graphical output of the gaming application and may use it to dynamically determine contextual data, as similarly discussed above. In one example, a rendered graphical output may be used to identify a luminance value and a color value, and such values may be parsed as contextual data. Accordingly, the central wireless device may be configured to dynamically determine such contextual data based on outputs of the application itself. It will be appreciated that this contextual data may be combined with additional contextual data discussed above with reference to FIG. 5. In this way initial contextual data may be updated dynamically with contextual data obtained from dynamic content executed by the central wireless device.

In various embodiments, dynamic updating of contextual data may be based on data and events other than that of the gaming application. More specifically, a system event detected by a wireless device implemented in the smart home environment may cause a dynamic update of the contextual data and a corresponding implementation of new contextual parameters and instructions. In one example, an event, such as a door opening, may be detected and may trigger implementation of a set of settings and operations for the wireless devices in the smart home environment such as a pause in operation or a termination of operation. In another example, the detection of the event may trigger another action, such as a pop up message or other function call or invocation of another application. In this way, the dynamic monitoring performed during operation 602 may trigger the generation of a variety of different types of instructions.

Method 600 may perform operation 604 during which a plurality of contextual parameters may be determined based on the contextual data and metadata associated with the application. As similarly discussed above, contextual data may be merged and used to generate contextual parameters based on one or more mapping operations. For example, the retrieved and merged data may be mapped to one or more category identifiers based on a designated mapping determined by an entity, such as a manufacturer or administrator. In one example, contextual data obtained from an audio output of a gaming application may be mapped to a category associated with speakers included in the smart home environment, and a video output of the gaming application may be mapped to a category associated with lights included in the smart home environment. Such a mapping may be generated based on a known format of the audio and video output as well as known capabilities of the wireless devices in the smart home environment. The category identifiers may be semantic identifiers chosen by an entity, such as a manufacturer or administrator, or may be arbitrary unique identifiers.

Method 600 may perform operation 606 during which a plurality of wireless devices may be identified based on a comparison of the contextual parameters and wireless device parameters. Accordingly, the contextual parameters may be mapped to wireless devices based on known wireless device information, as similarly discussed above. Thus, during operation 606, wireless devices may be identified to implement the settings inferred from the contextual data and contextual parameters. As similarly discussed above, the known wireless devices may be included in a list that may be populated based on a previous registration process of those wireless devices with the central wireless device, as well as an indication, such as an acknowledgement message received within a designated previous window of time, that those devices are active and available. Accordingly, during operation 606, the a set of wireless devices may be identified to implement settings determined based on the contextual parameters. As similarly discussed above, the wireless devices may also have associated wireless device parameters that specify various wireless device information for the wireless devices.

Method 600 may perform operation 608 during which wireless connection parameters may be determined based on wireless device parameters of the plurality of wireless devices. As similarly discussed above, the identified wireless devices may have associated wireless connection data that may also be retrieved. Such connection data may identify a type of wireless protocol used by the device as well as any other suitable network settings associated with the identified wireless devices.

Method 600 may perform operation 610 during which instructions may be generated for each of the plurality of wireless devices based on the contextual parameters and the wireless connection parameters. As similarly discussed above, the central wireless device may generate a set of instructions for each of the identified wireless devices in accordance with their respective wireless connection parameters. More specifically, the central wireless device may generate a set of instructions based on the identified contextual parameters in a native programming format of each respective wireless device. The instruction may also be compatible with and packetized in accordance with a wireless protocol of the target wireless device. This may be performed for each identified contextual parameter, and the instructions may subsequently be transmitted to the target wireless devices. Accordingly, during operation 610 a set of instructions may be generated for all applicable wireless devices in the smart home environment, and a schedule of traffic may also be generated. Thus, the central wireless device may also determine a schedule used for transmission of the instructions.

Method 600 may perform operation 612 during which the instructions may be transmitted to the plurality of wireless devices. Accordingly, processing logic of the central wireless device may transmit the instructions to each of the appropriate wireless devices in accordance with their respective communications protocols. As similarly discussed above, such instructions may be sent via one or more of several collocated transceivers compatible with a Wi-Fi, Bluetooth, and 802.15.4 protocol.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   determining, using a processing device, a plurality of contextual parameters identifying a plurality of settings based on application data of an application executed on a central wireless device, the plurality of settings being determined for a plurality of wireless devices included in an operational environment of the central wireless device, and the plurality of contextual parameters being determined dynamically based on the execution of the application data;

determining, using the processing device, a plurality of wireless device parameters and wireless connection parameters for the plurality of wireless devices based on the contextual parameters; and generating, using the processing device, instructions for each of the plurality of wireless devices based, at least in part, on the plurality of contextual parameters and a native format and wireless protocol of each of the plurality of wireless devices.

2. The method of claim 1, the plurality of contextual parameters is determined based, at least in part, of a user profile of a user of the central wireless device.

3. The method of claim 1, wherein at least some of the plurality of wireless devices are compatible with one or more of a Bluetooth Low Energy protocol and an 802.15.4 protocol compatible with a Matter standard.

4. The method of claim 1, wherein at least some of the contextual parameters are dynamically determined based on the execution of the application and dynamic content of the application.

5. The method of claim 4, wherein the at least some of the contextual parameters are determined based on metadata of the application.

6. The method of claim 5 further comprising:

retrieving the at least some of the contextual parameters from the metadata via an application program interface of the central wireless device.

7. The method of claim 1 further comprising:

mapping the plurality of contextual parameters to a plurality of operations to be performed by the plurality of wireless devices; and generating the instructions based, at least in part, on the mapping.

8. The method of claim 1, wherein the central wireless device is a gaming console.

9. The method of claim 8, wherein the plurality of wireless devices comprises at least one game controller, at least one smart home device, and at least one component of a home entertainment system.

10. A system comprising:

a first transceiver configured to be compatible with a first wireless protocol;

a second transceiver configured to be compatible with a second wireless protocol;

a third transceiver configured to be compatible with a third wireless protocol; and a processing device coupled to the first transceiver, the second transceiver, and the third transceiver, and configured to:

determine a plurality of contextual parameters identifying a plurality of settings based on application data of an application executed on a central wireless device, the plurality of settings being determined for a plurality of wireless devices included in an operational environment of the central wireless device, and the plurality of contextual parameters being determined dynamically based on the execution of the application data;

determine a plurality of wireless device parameters and wireless connection parameters for the plurality of wireless devices based on the contextual parameters; and generate instructions for each of the plurality of wireless devices based, at least in part, on the plurality of contextual parameters and a native format and wireless protocol of each of the plurality of wireless devices.

11. The system of claim 10, wherein the plurality of contextual parameters is determined based, at least in part, of a user profile of a user of the central wireless device.

12. The system of claim 10, wherein the second transceiver is configured to be compatible with a Bluetooth Low Energy protocol, and wherein the third transceiver is configured to be compatible with an 802.15.4 protocol compatible with a Matter standard.

13. The system of claim 10, wherein at least some of the contextual parameters are dynamically determined based on the execution of the application, and wherein the at least some of the contextual parameters are determined based on metadata of the application.

14. The system of claim 13, wherein the processing device is further configured to:

retrieve the at least some of the contextual parameters from the metadata via an application program interface of the central wireless device.

15. The system of claim 10, wherein the processing device is further configured to:

map the plurality of contextual parameters to a plurality of operations to be performed by the plurality of wireless devices; and generate the instructions based, at least in part, on the mapping.

16. A device comprising:

one or more processors configured to:

determine a plurality of contextual parameters identifying a plurality of settings based on application data of an application executed on a central wireless device, the plurality of settings being determined for a plurality of wireless devices included in an operational environment of the central wireless device, and the plurality of contextual parameters being determined dynamically based on the execution of the application data;

determine a plurality of wireless device parameters and wireless connection parameters for the plurality of wireless devices based on the contextual parameters; and generate instructions for each of the plurality of wireless devices based, at least in part, on the plurality of contextual parameters and a native format and wireless protocol of each of the plurality of wireless devices.

17. The device of claim 16, the plurality of contextual parameters is determined based, at least in part, of a user profile of a user of the central wireless device.

18. The device of claim 16, wherein at least some of the plurality of wireless devices are compatible with one or more of a Bluetooth Low Energy protocol, and an 802.15.4 protocol compatible with a Matter standard.

19. The device of claim 16, wherein at least some of the contextual parameters are dynamically determined based on the execution of the application, and wherein the at least some of the contextual parameters are determined based on metadata of the application.

20. The device of claim 19, wherein the one or more processors are further configured to:

retrieve the at least some of the contextual parameters from the metadata via an application program interface of the central wireless device.

\*  \*  \*  \*  \*